United States Patent [19]

Piccoli

[11] Patent Number: 4,585,035

[45] Date of Patent: Apr. 29, 1986

[54] REINFORCED HOSE

[75] Inventor: Dante E. Piccoli, Canton, Ohio

[73] Assignee: The Goodyear Tire & Rubber Company, Akron, Ohio

[21] Appl. No.: 562,884

[22] Filed: Dec. 19, 1983

[51] Int. Cl.[4] .............................................. F16L 11/04
[52] U.S. Cl. .................................... 138/127; 138/125; 138/126; 138/133
[58] Field of Search ............... 138/125, 126, 127, 130, 138/133; 156/149; 139/387 R

[56] References Cited

U.S. PATENT DOCUMENTS 1,736,106 11/1929 Williamson ........................ 138/127
2,829,671 4/1958 Ernst et al. ...................... 138/127 X
3,481,368 12/1969 Vansickle et al. .............. 138/133 X
3,905,398 9/1975 Johansen et al. ................ 138/125 X
4,259,991 4/1981 Kutoyak .......................... 138/125 X Primary Examiner—James E. Bryant, III
Attorney, Agent, or Firm—R. D. Thompson

[57] ABSTRACT

A flexible hose having a braided spiral reinforcement layers having one wire braid member which remains uncrimped during braiding and a second braid member which is composed of a relatively flexible, high tenacity material which is crimped or deformed around the wire braid member at each contact point in the braided-spiral layer. The hose may be made using a flexible mandrel technique to produce a light weight hose having improved flexibility for use in high pressure applications such as in hydraulic system components.

5 Claims, 6 Drawing Figures

REINFORCED HOSE

BACKGROUND OF THE INVENTION

This invention relates to a reinforced hose used in high pressure fluid transport applications and to a method for manufacturing this improved hose. More particularly, the invention relates to a hose having braided spiral reinforcement layers in which a first braid member is steel wire and the second braid member is a flexible, high strength member capable of being braided at equal tensions to the steel wire.

BACKGROUND ART

In high pressure applications such as hose used in hydraulic systems, it is desirable for the hose to be of minimum weight, maximum flexibility and yet still be capable of withstanding very high internal working pressures and many thousands of pressure surge and relaxation cycles. Known hose structures utilize reinforcement layers composed principally of steel wire. The reinforcement layers may be all wire braided construction, all wire spiral construction or a wire spiral with a very low tensile strength textile pick yarn braided through the wire spiral. Each of the known wire reinforcement construction suffer from one or more deficiencies. The all wire braided constructions are heavy and relatively inflexible thus limiting the bending radii of the hose. The spiral reinforced wire hose constructions must be made using rigid mandrels due to the twisting tendency of the helix wire which would bend flexible mandrels during application of the reinforcement. This twisting is especially pronounced during the application of the first, third, fifth, etc., spiral layers since there is no counter balancing force exerted by an opposing spiral layer. The solid steel mandrels limit the length of hose which may be produced due to limitations in the size of the building and curing equipment available. Typically 50 to 100 feet is the practical limit of the length of each individually produced rigid mandrel spiral hose. One known hybrid type hose employs a steel wire reinforcement as one component in a braid configuration and the other component is a low strength cotton or textile yarn which is interwoven with the wire component of the braid to form a reinforcement layer. This construction suffers from all of the same deficiencies as the all wire spiral which are centered on the unbalanced tension characteristic of each individual reinforcement layer.

Wire braid hose suffers impulse failure due to abrasion or fretting between the wires during repeating pressure impulses. The abrasion occurs primarily at the points of intersection throughout the braided layer. During braiding the wires become crimped and innerlocked thus making it very difficult for one member of the braid to slide over the other member during pressure surges or impulses. This physical innerlock of the crimped wire members of the braid also contribute to the tendency of these all wire braided hose constructions to be stiff and relatively inflexible.

In accordance with the present invention a hose having a high burst strength and excellent impulse life can be produced using less wire reinforcement than conventional wire braided constructions. The hose construction also is more flexible. The hose produced has equal tension on every member of the reinforcement layer thus eliminating any twisting moment during the application of successive reinforcement layers. The method of producing such a hose has the advantage of exerting balanced tensions on all reinforcement materials during hose construction. The balanced tension of each individual reinforcement layer allows the hose to be built on a flexible mandrel which enables the manufacturer to produce the hose in long economical lengths. Long length hose production allows efficient use of existing braiding equipment and curing equipment. Since the individual reinforcement layers are of balanced tension the resulting hose product is under no residual twisting stress and thus has no tendency to twist when internal pressure is applied. These advantages are accomplished by utilizing a flexible hose comprising A flexible hose comprising an elastomeric tube, a braiding spiral sleeve surrounding said elastomeric tube having a first braid member and a second braid member under equal tension, said first braid being composed of at least one strand of wire helically wound about said elastomeric tube; said second braid member being composed of a plurality relatively flexible filament having a tenacity of at least 12 grams/denier wound oppositely of said first braid member and interwoven with said first braid member such that said second braid member is crimped at each point of contact with said first braid and said first braid remains uncrimped at each point of contact.

The advantages of the improved method are accomplished by a flexible mandrel method of manufacturing wire reinforced flexible hose having braided spiral reinforcement comprising extruding an elastomeric tube over a flexible mandrel applying a braided spiral sleeve around said elastomeric tube to form a hose composite, said braided spiral sleeve being composed of a first braid member of wire wound in a smooth helical path about said tube and a second braid member being braided with said first braid member such that the second braid member is crimped at each point of contact with the first braid member, and wherein the braiding tensions of the first and second braid member are equal, said second braid member having a tenacity of at least 12 grams per denier.

DETAILED DESCRIPTION OF THE INVENTION

Figure 1:
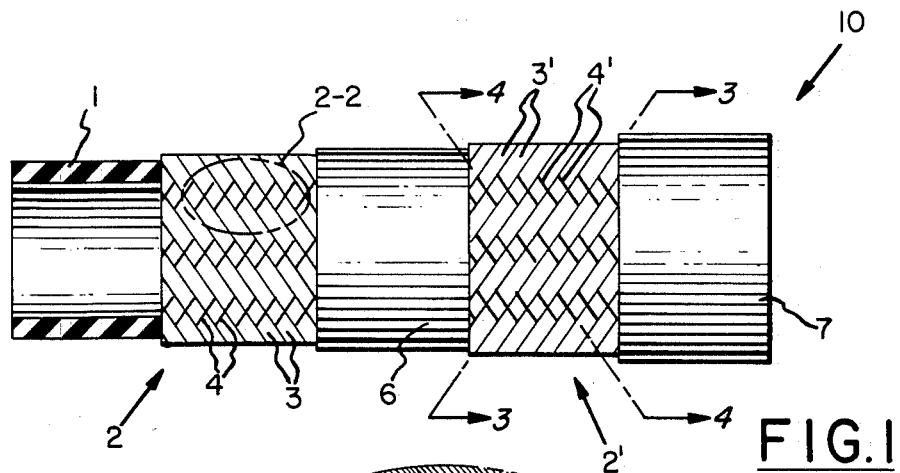
FIG. 1 is a side view of a section of a hose showing the preferred embodiment of this invention with a part in section and other parts broken away for clarity.

Referring to FIG. 1, the hose 10 comprises an elastomeric tube 1 of a material suitable for conveying or containing the fluid to be transported. Any suitable rubber or thermoplastic elastomer known to be useful in hose applications may be used. These may include rubber polymers such as polychloroprene, chlorinated polyethylene acrylonitrile-butadiene, styrene butadiene, polyisoprene, polybutadiene, ethylene-propylene-diene terpolymers, chlorinated polyethylene, and natural rubber polymers. Representative thermoplastic elastomers include propylene modified with ethylene-propylene rubber such as Santoprene, available from Monsanto Corp., block polymers, such as the Kraton line of polymer available from Shell Chemical Company, polyvinyl chloride, etc. These elastomers may be compounded with other fillers, plasticizers, antioxidants, cure systems to achieve particular properties required for specific applications. The elastomeric tube 1 is surrounded by a first braided spiral sleeve 2 consisting of a first braid member 3 which is composed of bundles of high tensile, low elongation untwisted strands of wire. Steel wire is most commonly used and may be brass plated to increase the adhesion between the wire and the elastomeric material of the adjacent layers. The number of strands of individual wire in each wire bundle and the gauge of the wire strands are dependent upon the load carrying requirements of the hose to be manufactured. The gauge of the wire is limited only by the capabilities of the braiding equipment being utilized. Current commercially available braiders can utilize individual strand gauges of from about 0.005 to about, 0.036 inches (0.1 to 9 mm). The second braid member 4 is wound or braided in a helical pattern from an opposite direction to the first braid member 3. The second braid member 4 is innerwoven with the first braid member 3. The second braid member must be very flexible relative to the first braid member. The second braid member must have individual filaments having a tenacity of at least 12 grams per denier an elongation at break below about 7 percent. Any synthetic polymeric filament or fiber having the aforesaid tenacity and elongation may be used, but best results have been obtained with filaments spun from an aromatic polyamide fiber marketed by E. I. du Pont Nemours & Co. under the trademark Kevlar TM and commonly known as an aramid filament. Fiberglass filaments and carbon filaments of the prescribed tenacity and elongation may be utilized as well. The conventional textile filament yarns of nylon, polyester, rayon, or cotton may not be used in this invention since they do not have the required tenacity or strength to be braided at equal tensions with the wire braid member.

Figure 6:
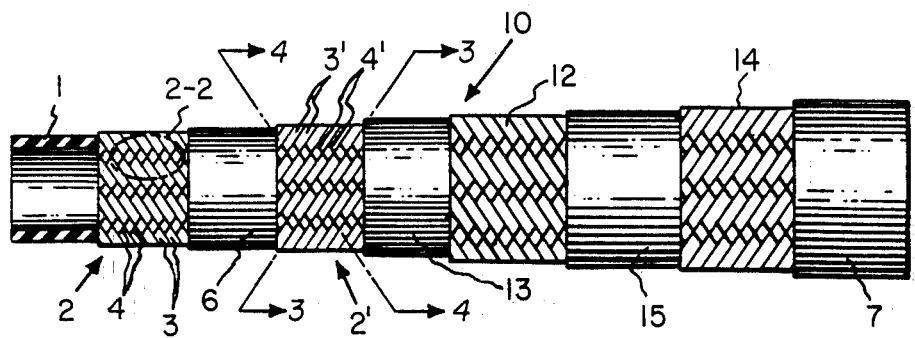
FIG. 6 is a hose having four braided spiral reinforcement sleeves.

The first braid member 3 follows a smooth helical course and exhibits no crimping during the braiding operation. The second braid member 4 is innerwoven in a helical pattern from an opposite direction and exhibits crimping or kinking at each point where it is innerwoven with the first braid member 3. It is critical to the achievement of the advantages of the hose construction of this invention that the first and second braid members 3 and 4 be braided under equal tension during the braiding step. In the manufacture of wire braided hose the braiding tension is generally above 10 foot-pounds (13.6 Nm) and preferably from 18 to 28 foot-pounds (24 to 38 Nm). After braiding the relatively stiff first braid member remains uncrimped and lies substantially in an imaginary cylindrical surface surrounding the elastomeric tube at an appropriately spaced radial distance from the outer surface of said elastomeric tube. Each subsequent braided spiral layer should have the wire braid member helically applied in an opposite sense or direction to the previous layer. FIG. 1 illustrates a two layer braided spiral reinforcement structure showing the relationship of the first braid members 3 and 3' of adjacent braided spiral layers 2 and 2' respectively. The first braided spiral sleeve 2 is overlaid with a second braided spiral sleeve 2' in which the first braid member 3' is oppositely wound to first braid member 3. Similarly the second braid member 4 is wound oppositely of the corresponding braid member 4 of the first braid spiral sleeve 2. Additional balanced sets of braided spiral sleeves 12, 14 as shown in FIG. 6 which has all the elements of FIG. 1 may be applied to the hose construction as required to meet the particular burst strength and impulse life requirements of the application. An elastomeric insulation layer 6 13, 15 is applied between braided spiral sleeves. An elastomeric cover 7 is shown in FIG. 1 surrounding the outer most braided spiral layer and may be composed of any suitable rubber or thermoplastic elastomer known to be useful in hose constructions as previously described.

The equality of tension under which the first braid member and the second braid member are applied to the underlying structure is critical to the operation of this invention. It has been found that equality of braiding tension can not be achieved using conventional textile yarns having filaments of polyester, nylon, rayon, or cotton, etc. These conventional textile yarns break during high speed braiding due to fretting and abrasion as well as inadequate tensile strength and excessive elongation. Tenacity of a filament is defined as:

$$\text{tenacity} = \frac{\text{breaking strength of filament in grams}}{\text{denier}}$$

The term elongation refers to the percentage of elongation at the breaking point of a filament, also known as ultimate elongation. The conventional textile yarns which are unusable in this invention have tenacities ranging from 4 to about 10 grams/denier and elongations of 9 to about 20 percent. Materials which are useful in this invention as the second braid member must have a tenacity above 12 grams per denier and preferably between 15 and 25 grams per denier. The elongation must be about 0.5 to about 7 percent, with the preferred range being from 2 to 5 percent. Representative materials for filaments for the second braid member are polyamides, polyimides, polyoxadiazoles, polybenzimidazoles, carbon fibers, and fiberglass. The preferred materials are aromatic polyamides, commonly known as aramids and represented by the products known by the tradename of Kevlar TM, commercially available from E. I. du Pont de Nemours & Company.

The equal tension on each of the component members of the braided spiral is important to achieve the advantages of this invention. First, the balanced tension on the braided components allows for a flexible mandrel hose building technique to be utilized. The balanced tension assures that no twisting force is put on the underlying elastomeric tube and mandrel during its progress through the braiding decks. Secondly, this equal braid member tension in the finished hose assures a stable non-twisting finished hose is produced upon completion of the curing step. Previously known constructions utilizing wire braid members with low tensile strength textile second braid members have the disadvantage of having unbalanced tensions in each layer, which make it impossible to employ flexible mandrell methods of manufacturing hose.

The angle at which the first and second braid members are applied in the braided spiral sleeve is dependent upon the application and as is commonly known in the industry braid angles may vary between 45° and 65° although for many applications the preferred angle is near the so-called neutral angle of 54.7°. The neutral angle should produce a hose which neither expands nor contracts under internal pressure.

Figure 2:
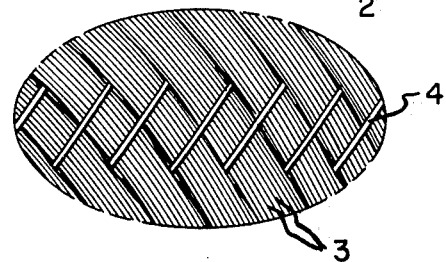
FIG. 2 is an enlargement of the braided spiral sleeve 2 taken at 2—2.

FIG. 2 is an enlarged portion of the exposed braided spiral sleeve 2 from FIG. 1. The plurality of individual strands of wire in the first braid member 3 are shown in grater detail. The wire strands lie almost in a continuous sprial except where the spiral is interrupted by the passage of the second braid member 4 over and under the first braid member. A high strength, low denier second braid member is essential since the degree of disruption of the smooth spiral of the first braid member 3 is minimized by the use of such a second braid member. Maximum burst strengths for a given weight of reinforcing wire in a hose is achieved by having a smooth spiral rather than bundled wire strands. The hose construction of this invention uniquely blends the performance advantages of spiral wound wire hose with the production efficiencies of braided wire hose constructions.

Figure 3:
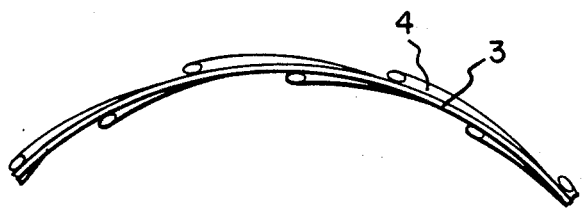
FIG. 3 is a diagonal cross-sectional view of the braided spiral sleeve only as shown in FIG. 1 taken on line 3—3.

FIG. 3 is a cross-sectional view of the braided spiral sleeve 2 of FIG. 1 taken along line 2—2 which shows more clearly the configuration of the first and second braid members 3 and 4 respectively after the braiding step has been completed. The wire first braid member 3 is shown in cross-section as a smooth uncrimped band of filaments which clearly shows the smooth helical path of the first braid member. In cross-section the first braid member 3 is shown to lie clearly in a smooth cylindrical surface having a diameter equal to the diameter of the braided spiral sleeve. The wire member lies in an annular ring of indeterminate length having a width substantially equal to the thickness of the first braid member 3. The second braid member 4 is shown in cross-section to be deformed around the first braid member 4 at each contact point. Thus, unlike conventional wire braiding methods in which each wire braid member is deformed around the other, in the method of this invention the first braid member of wire is uncrimped while only the second braid member is deformed or crimped around the first braid member.

Figure 4:
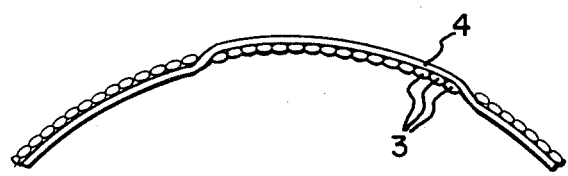
FIG. 4 is a diagonal cross-sectional view of the braided spiral sleeve only as shown in FIG. 1 taken on line 4—4.

FIG. 4 is a cross-section of the braided spiral layer of FIG. 1 taken along line 3—3 on FIG. 1. FIG. 4 shows the course of the second braid member 4 around the circumference of the braided spiral sleeve 2. It can be clearly seen that the second braid member 4 deforms around the first braid member during the braiding operation since it is composed of a more flexible material than the first braid member.

Figure 5:
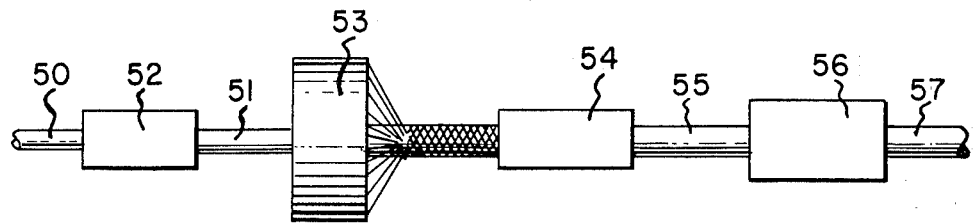
FIG. 5 is a simplified schematic representation of the method of manufacture of the hose of this invention.

FIG. 5 is a simplified schematic representation of the flexible mandrel method of manufacturing the hose of this invention. While solid mandrels may be employed in the manufacture of this hose, flexible mandrels are most preferred due to the inherent advantages of lower cost and higher speed of manufacturing. Manufacturing on solid mandrels imposes a limit on the length of hose which may be produced in any single operation. 50 to 10 foot lengths are the practical limitations on most wire braid manufacturing processes. The 50 to 100 foot lengths require corresponding amounts of floor space to accommodate the long length solid mandrels. In addition, expensive cure methods must be employed since the curing equipment must be capable of accepting these long lengths. If conventional spiral wound wire reinforced hose is manufactured, it requires that solid mandrels be utilized due to the twisting moment that is produced during unbalanced helical winding of the steel wire in a single bias direction. If a flexible mandrel were used in such a conventional wire spiral hose manufacturing process the flexible mandrel would twist between spiral application points and cause non-uniform spiral layers to be applied.

If flexible mandrels can be utilized in a hose manufacturing operation the resulting hose product can be made at low cost due to the long continuous lengths of hose which can be produced in very little space. The reasons for the space compaction is the fact that the hose can be reeled onto take-offs after the manufacturing steps have been completed. The uncured hose on compact reels can be then placed in a relatively small curing apparatus such as an autoclave where hundreds of feet of hose may be cured in one cure cycle.

The flexible mandrel method for producing the braided spiral hose of this invention is shown schematically in FIG. 5 and includes the following steps: A flexible mandrel 50 is covered by an elastomeric tube member 51 by any convetional means such as a cross-head extruder 52 or by spiraling on an unsupported rubber layer. Any of the steps described in this method may be conducted separately and later conveyed to the next stage or the steps may be conducted consecutivey to form a continuous production operation.

FIG. 5 shows the elastomeric tube 51 overlying the flexible mandrel 50 being fed directly to a braider 53 for application of the braided spiral sleeve. Conventional braider equipment may be utilized provided that equal tensioning of the individual braid members can be precisely maintained. The braider may apply two or more braided spiral sleeves to the elastomeric tube in a single pass. Each portion of the machine which applies an individual braided spiral layer will be described as a deck. The carriers of the braider which wind a braid member in a first direction must carry the first braid member, steel wire. The carriers which apply the second braid member from the opposite direction should carry the second braid member material, that material having a tenacity above 12 grams per denier and having an elongation below 7 percent. The first braid member, being substantially stiffer than the second braid member, will undergo no crimping or kinking during the braiding step so the first braid member will assume a smooth spiral course very similar in appearance to a spiral applied layer. The second braid member, being substantially more flexible then the first braid member, will deform around the first braid member at each intersection of the members in the braided spiral sleeve. The tension on each set of carriers in each braiding deck must be precisely maintained in balance. The first braid member must be applied at the same tension as the second braid member. Most currently available braiders using steel wire of, 0.012 to 0.026 inches (0.3 to 0.7 mm) in diameter are maintained in the tension range of 20 to 40 foot-pounds of tension (27 to 54 Nm). Elastomeric insulation layers are interposed between successive braided spiral layers. The insulation layers may be spiralled, extruded or simply laid on between braiding deck 5. Once the desired number of braided spiral sleeves have been applied, an elastomeric cover may be applied over the braided sleeves by cover applicator 54. Any conventional process for the application of cover layers to a hose may be utilized with the most common method being the use of a cross-head extruder. The uncured composite hose 55 exits from the cover applicator 54 and precedes to the curing process 56. The curing process may be any conventionally known method of curing or vulcanizing hose used in flexible mandrel methods. The preferred methods are those of lead press or spirally wrapped cure tape methods so long as the hose layers can be adequately consolidated and bonded during the curing process. Continuous vulcanization methods such as fluidized bed curing or vulcanization methods using heat transfer media such as molten salts or hot oil may be utilized as well. If such continuous methods are utilized the hose may be fed directly and continuously from the hose cover applicator 54 to the curing step. Other methods such as open steam vulcanization in an autoclave would require that the uncured hose composite 53 be reeled into a convenient form and placed batch-wise into the autoclave.

EXAMPLES 1-4

Hose specimens were produced according to this invention for use as high pressure reinforced rubber covered hydraulic hose designed to meet The Society of Automotive Engineers specifications, SAE 100-R2. These specifications set various construction criteria and physical property miniums including burst strength, impulse testing, leakage testing, bend radius and oil resistance. The construction of this SAE 100-R2 specification for Type A hose requires that the hose to be a two wire braid reinforcement construction.

The hose was produced in several sizes as indicated below in Table I. The hose structure consisted of a synthetic rubber tube made from polychloroprene rubber and extruded through a cross-head extruder over a flexible mandrel. The flexible mandrel with the tube was then past through a multi-deck braider that was set up such that the carriers going in one direction were loaded with the wire reinforcement while the carriers rotating in the opposite direction were carrying the aramid fiber which is the second braid member of this invention. All carriers were set at the same tension level. After the first braided spiral layer was applied a synthetic rubber insulation layer was placed on the first braided spiral layer just prior to the entry into the second braiding deck where the carriers having wire were rotating in the opposite direction to the carriers of the first deck and the aramid cord likewise was being carried in an opposite sense to the first deck. The braided carcass on the flexible mandrel was then past through a cover machine which consisted of a cross-head extruder where a polychloroprene rubber cover was applied. The covered hose preform was then wrapped with nylon fabric which is commonly used as cure tape. The wrapped hose preform was then cured in an autoclave using open steam. The particular wire and aramid specifications for the various sizes produced are listed below as Examples 1-4.

TABLE I

| Example | I.D., inc. (mm) | Wire Gauge | Number of Wire Ends Per Braid | Total Carriers Per Braid | Second Braid Member (Aramid) Denier/Strands |
|---|---|---|---|---|---|
| 1 | ⅜ (9.5) | .015 | 66 | 24 | 1000/1 |
| 2 | ½ (12.7) | .015 | *72 | 24 | 1000/1 |
| 3 | ¾ (19.0) | .015 | 108 | 24 | 1000/1 |
| 4 | 1 (25.4) | .015 | 153 | 36 | 1000/1 |

*The second braided spiral layer contained 84 ends

Hoses produced as described above Examples 1-4 were tested for compliance with SAE 100-R2 specifications and found to meet or exceed all physical property minimums specified in that test sequence.

COMPARATIVE EXAMPLES 5-8

Conventional wire braid hose conforming to specifications of SAE 100-R2 were produced using wire on both sets of carriers on the two braiding decks. The cover and tube and friction materials were the same as those employed above in Examples 1-4. These conventional two braid wire hydraulic hose constructions were compared to Examples 1-4 for weight of reinforcement utilized. Examples 1 and 5, 2 and 6, 3 and 7, and 4 and 8 all meet the same level of SAE 100-R2 specifications. However, when the weights of reinforcement utilized to meet those specification is compared it is found that the hose construction of this invention utilizes from 21 to 50 percent less wire reinforcement in order to meet the same physical property specifications. Comparing 1 and 5, hose number 1 used 21.6 percent less reinforcement by weight than hose 5. Hose 2 utilized 32.6 percent less than hose 6. Hose 3 utilized 36.4 percent less then hose 7, and hose 4 utilized 49.7 percent less then hose 8.

TABLE II

| Example | I.D., in. (mm) | Wire Gauge | Wire Ends Per Braid | Carriers Per Braid |
|---|---|---|---|---|
| 5 | ⅜ | .012 | 168 | 24 |
| 6 | ½ | .012 | 192 | 24 |
| 7 | ¾ | .012 | 240 | 24 |
| 8 | 1" | .012 | 216 | 36 |

While certain representative embodiments and details have been shown for the purpose of illustrating the invention, it will be apparent to those skilled in this art that various changes and modifications may be made therein without departing from the scope of the invention.

I claim:
1. A flexible hose comprising:
 (a) a radially innermost elastomeric tube;
 (b) a first braided spiral sleeve surrounding the elastomeric tube;
 (c) a second braided spiral sleeve disposed radially outwardly of the first braided spiral sleeve; and
 (d) an elastomeric insulating layer interposed between the first and second braided spiral sleeves, each braided spiral sleeve having a first braid member and a second braid member under equal tension, said first braid being composed of at least one strand of wire helically wound about said elastomeric tube in a smooth helical path to form a continuous flat spiral having the form of an annular ring with a thickness equal to the diameter of the wire when viewed in radial cross-section, said second braid member being composed of a single yarn with greater flexibility than said first braid and having filaments with a tenacity of at least 12 grams/denier and an elongation of less than 7% wound oppositely of said first braid member and interwoven with said first braid member such that there is minimal disruption of the annular ring of the first braid member and said second braid member is crimped at each point of contact with said first braid and said first braid remains uncrimped at each point of contact.

2. A flexible hose according to claim 1 wherein said relatively flexible filament is selected from the group of filaments made from polyamides, polyimides, polyoxadiazoles, polybenzimidazoles, carbon fibers and fiberglass.

3. A flexible hose according to claim 1 further comprising additional braided spiral sleeves with an elastomeric insulation layer interposed between each adjacent sleeve.

4. A flexible hose according to claim 1 wherein the flexible filament is an aromatic polyamide fiber.

5. A flexible hose according to claim 1 further comprising a radially outermost elastomeric cover.

* * * * *